US012703321B1

(12) United States Patent
Sirapareddy et al.

(10) Patent No.: US 12,703,321 B1
(45) Date of Patent: Aug. 11, 2026

(54) SEATBELT ASSEMBLY

(71) Applicant: GM GLOBAL TECHNOLOGY OPERATIONS LLC, Detroit, MI (US)

(72) Inventors: Niranjan R. Sirapareddy, Bangalore (IN); Rajamanickam Vs, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/242,043

(22) Filed: Jun. 18, 2025

(51) Int. Cl.

| | |
|---|---|
| ***B60R 22/18*** | (2006.01) |
| ***A44B 11/25*** | (2006.01) |
| ***B60R 22/24*** | (2006.01) |
| ***B60R 22/26*** | (2006.01) |

(52) U.S. Cl.
CPC .......... *B60R 22/18* (2013.01); *A44B 11/2561* (2013.01); *B60R 22/24* (2013.01); *B60R 22/26* (2013.01); *B60R 2022/1806* (2013.01); *B60R 2022/1812* (2013.01)

(58) Field of Classification Search
CPC ......... B60R 22/18; B60R 22/24; B60R 22/26; B60R 2022/1806; B60R 2022/1812; A44B 11/2561; A44B 11/2553; A44B 11/25; Y10T 24/45241; Y10T 24/45215
USPC ..... 280/801.1, 808; 297/483, 468; 24/593.1, 24/589.1
See application file for complete search history.

(56) References Cited

U.S. PATENT DOCUMENTS

| | | | | |
|---|---|---|---|---|
| 4,101,171 A * | 7/1978 | Sasaki | A44B 11/2561 | 297/483 |
| 5,941,337 A * | 8/1999 | Castellanos | B60R 25/22 | 24/651 |
| 5,984,358 A * | 11/1999 | Mar | A44B 11/2561 | 280/808 |
| 6,490,764 B1 * | 12/2002 | Bell | A44B 11/2561 | 24/633 |
| 9,623,837 B2 | 4/2017 | Mker | | |
| 12,269,416 B2 * | 4/2025 | Moeker | A44B 11/2557 | |
| 2006/0138852 A1 * | 6/2006 | Ichida | A44B 11/2557 | 297/483 |
| 2006/0226694 A1 * | 10/2006 | Higuchi | B60R 22/4604 | 297/483 |
| 2008/0066271 A1 * | 3/2008 | Feile | A44B 11/2561 | 24/593.1 |

(Continued)

FOREIGN PATENT DOCUMENTS

| | | | |
|---|---|---|---|
| CN | 215189698 U * | 12/2021 | |
| DE | 102004056496 A1 * | 5/2006 | B60R 21/18 |

(Continued)

OTHER PUBLICATIONS

German Office Action for German Application No. 102025131144.7; dated Mar. 6, 2026; 3 pages.

*Primary Examiner* — Keith J Frisby
(74) *Attorney, Agent, or Firm* — CANTOR COLBURN LLP

(57) ABSTRACT

A latching structure for a vehicle seatbelt defines a longitudinal direction, a width direction, and a thickness direction, and includes a main body having a latch loop defined at least in part by an upper edge, a lip structure, and a lower edge. The latch loop includes a first opening defined between the upper edge and the lower edge, and a second opening defined between the lip structure and the lower edge.

18 Claims, 8 Drawing Sheets

(56) References Cited

U.S. PATENT DOCUMENTS

2011/0107561 A1* 5/2011 Heym ................ B60R 22/1855
24/166
2012/0068520 A1* 3/2012 McFalls ............ A44B 11/2561
24/593.1
2012/0175936 A1* 7/2012 Miyagawa ............ B60R 22/12
297/479
2013/0240662 A1* 9/2013 Ito ........................ B60R 22/24
242/615.3
2014/0070596 A1* 3/2014 Tabata .............. A44B 11/2561
24/593.1
2014/0230195 A1* 8/2014 Ruge ..................... A44B 11/10
29/3
2015/0367800 A1* 12/2015 Zhang ............... A44B 11/2561
280/733
2016/0159315 A1* 6/2016 Moeker .................. B60R 22/18
24/183
2017/0055643 A1* 3/2017 Knoedl ............. A44B 11/2561
2017/0297528 A1* 10/2017 Hermann .......... A44B 11/2557
2020/0298791 A1* 9/2020 Clauss ................. B60R 22/201
2021/0237679 A1* 8/2021 Sasayama ............ B60R 22/201
2021/0345734 A1* 11/2021 Hermann .......... A44B 11/2553

FOREIGN PATENT DOCUMENTS

DE 102020133574 A1 * 6/2022 ......... A44B 11/2569
GB 2359330 A * 8/2001 ........... B60R 22/023
JP 2002274319 A * 9/2002
JP 2010137720 A * 6/2010
JP 2010159004 A * 7/2010
JP 2014131885 A * 7/2014
JP 2015120436 A * 7/2015
JP 2022104037 * 7/2022
JP 2022169013 A * 11/2022
KR 19990020385 U * 6/1999
WO WO-8303767 A1 * 11/1983 ......... A44B 11/2561
WO WO-2023198469 A1 * 10/2023 ......... B60R 22/1855

* cited by examiner

L
T
W
225
227
221
D1
231
224
233
D2
228
223

D5
230

D3
221,
521

SEATBELT ASSEMBLY

INTRODUCTION

The subject disclosure relates to a seatbelt assembly.

Vehicles include seatbelt assemblies to secure an occupant in a vehicle seat. Seatbelt assemblies are designed to reduce the risk of injury to an occupant of a vehicle during a collision. Improvements to seatbelt assemblies is desirable.

SUMMARY

In one exemplary embodiment, a latching structure for a vehicle seatbelt defines a longitudinal direction, a width direction, and a thickness direction, and comprises a main body comprising a latch loop defined at least in part by an upper edge, a lip structure, and a lower edge. The latch loop comprises a first opening defined between the upper edge and the lower edge, and a second opening defined between the lip structure and the lower edge.

In addition to one or more of the features described herein, the lip structure and the lower edge overlap along the thickness direction.

In addition to one or more of the features described herein, the upper edge and the lower edge do not overlap along the thickness direction.

In addition to one or more of the features described herein, a smallest distance in the longitudinal direction between the lip structure and the lower edge is defined as a minimum longitudinal distance, and the minimum longitudinal distance is less than a longitudinal distance between a lowermost end of the upper edge and an uppermost end of the lower edge.

In addition to one or more of the features described herein, a first side edge extends between the upper edge and the lower edge, and a second side edge extends between the lip structure and the lower edge.

In addition to one or more of the features described herein, the first and second side edges are opposite each other along the width direction.

In addition to one or more of the features described herein, the lip structure comprises tapered ends along the width direction.

In addition to one or more of the features described herein, an entirety of the lip structure is on one side of a longitudinal centerline of the latching structure.

In addition to one or more of the features described herein, a latch tongue extends from a lower side of the main body along the longitudinal direction.

In another exemplary embodiment, a seatbelt assembly comprises a latching structure defining a longitudinal direction, a width direction, and a thickness direction, and comprising a main body comprising a latch loop defined at least in part by an upper edge, a lip structure, and a lower edge, and a seatbelt passing through the latch loop. The latch loop comprises a first opening defined between the upper edge and the lower edge, and a second opening defined between the lip structure and the lower edge.

In addition to one or more of the features described herein, the lip structure and the lower edge overlap along the thickness direction.

In addition to one or more of the features described herein, the upper edge and the lower edge do not overlap along the thickness direction.

In addition to one or more of the features described herein, a smallest distance in the longitudinal direction between the lip structure and the lower edge is defined as a minimum longitudinal distance, and the minimum longitudinal distance is less than a longitudinal distance between a lowermost end of the upper edge and an uppermost end of the lower edge.

In addition to one or more of the features described herein, a first side edge extends between the upper edge and the lower edge, and a second side edge extends between the lip structure and the lower edge.

In addition to one or more of the features described herein, the first and second side edges are opposite each other along the width direction.

In addition to one or more of the features described herein, the lip structure comprises tapered ends along the width direction.

In addition to one or more of the features described herein, an entirety of the lip structure is on one side of a longitudinal centerline of the latching structure.

In addition to one or more of the features described herein, a latch tongue extends from a lower side of the main body along the longitudinal direction.

In addition to one or more of the features described herein, a smallest distance between the lip structure and the lower edge is defined as an absolute minimum distance and the absolute minimum distance is between 1 to 2 times a seatbelt thickness of the seatbelt.

In yet another exemplary embodiment, a vehicle comprises a vehicle seat; and a seatbelt assembly mounted on or adjacent to the vehicle seat. The seatbelt assembly comprises a latching structure defining a longitudinal direction, a width direction, and a thickness direction, and comprising a main body comprising a latch loop defined at least in part by an upper edge, a lip structure, and a lower edge, and a seatbelt passing through the latch loop. The latch loop comprises a first opening defined between the upper edge and the lower edge, and a second opening defined between the lip structure and the lower edge. The lip structure and the lower edge overlap along the thickness direction. The upper edge and the lower edge do not overlap along the thickness direction. A smallest distance in the longitudinal direction between the lip structure and the lower edge is defined as a minimum longitudinal distance, and the minimum longitudinal distance is less than a longitudinal distance between a lowermost end of the upper edge and an uppermost end of the lower edge. A first side edge extends between the upper edge and the lower edge, and a second side edge extends between the lip structure and the lower edge. The first and second side edges are opposite each other along the width direction. The lip structure comprises tapered ends along the width direction. An entirety of the lip structure is on one side of a longitudinal centerline of the latching structure. A latch tongue extends from a lower side of the main body along the longitudinal direction. A smallest distance between the lip structure and the lower edge is defined as an absolute minimum distance, and the absolute minimum distance is between 1 to 2 times a seatbelt thickness of the seatbelt.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
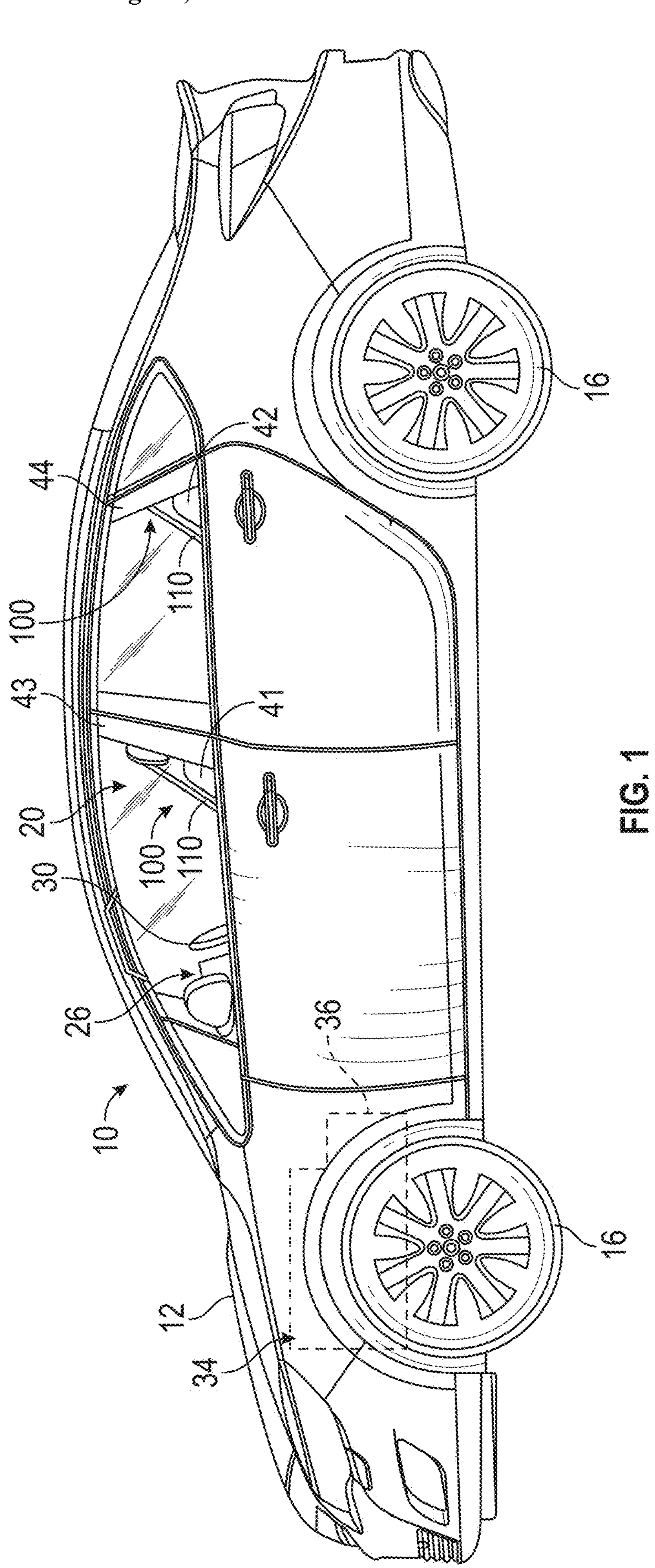
FIG. 1 is a left side view of a vehicle including a seatbelt assembly according to a non-limiting example.

The following description is merely exemplary in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle 10 according to a non-limiting example is shown in FIG. 1. The vehicle 10 includes a body 12 supported on a plurality of wheels 16. One or more of the plurality of wheels 16 are steerable. The body 12 may include a B-pillar 43 and a C-pillar 44. The body 12 defines, in part, a passenger compartment 20 having front vehicle seats 41 positioned behind a dashboard 26 and rear vehicle seats 42 behind the front vehicle seats 41. A steering control 30 is arranged between the front vehicle seats 41 and the dashboard 26. The steering control 30 is operated to control orientation of the steerable wheel(s) 16.

The vehicle 10 includes a prime mover 34 connected to a gear assembly and/or transmission 36 that provides power to one or more of the plurality of wheels 16. The prime mover 34 may be an engine, a motor, a hybrid engine and motor system, or other prime movers known in the art. A rechargeable energy storage system (RESS) may be arranged in the body 12 and may provide power to components within the vehicle 10 (e.g., the prime mover 34).

The vehicle 10 includes a seatbelt assembly 100 according to one or more embodiments. The vehicle 10 may include multiple seatbelt assemblies 100. As shown in FIG. 1, the seatbelt assembly 100 may be positioned at the front vehicle seats 41 (e.g., driver seat and/or front passenger seat) and/or the rear vehicle seats 42. The seatbelt assembly 100 includes a seatbelt 110 which, for the driver seat and/or front passenger seat, may be mounted to the B-pillar 43, and for the rear vehicle seats 42, may be mounted to the C-pillar 44 or on the rear vehicle seat 42. The vehicle 10 shown in FIG. 1 is a non-limiting example, and the seatbelt assembly 100 may be disposed in other types of vehicles. As a non-limiting example, the vehicle 10 may be an autonomous vehicle. The vehicle 10 may be a multi utility vehicle and the seatbelt assembly 100 may be positioned at any seat thereof. The vehicle 10 may be a larger vehicle with a D-pillar in which case a portion of the seatbelt assembly 100 may be mounted on the D-pillar.

Figure 2:
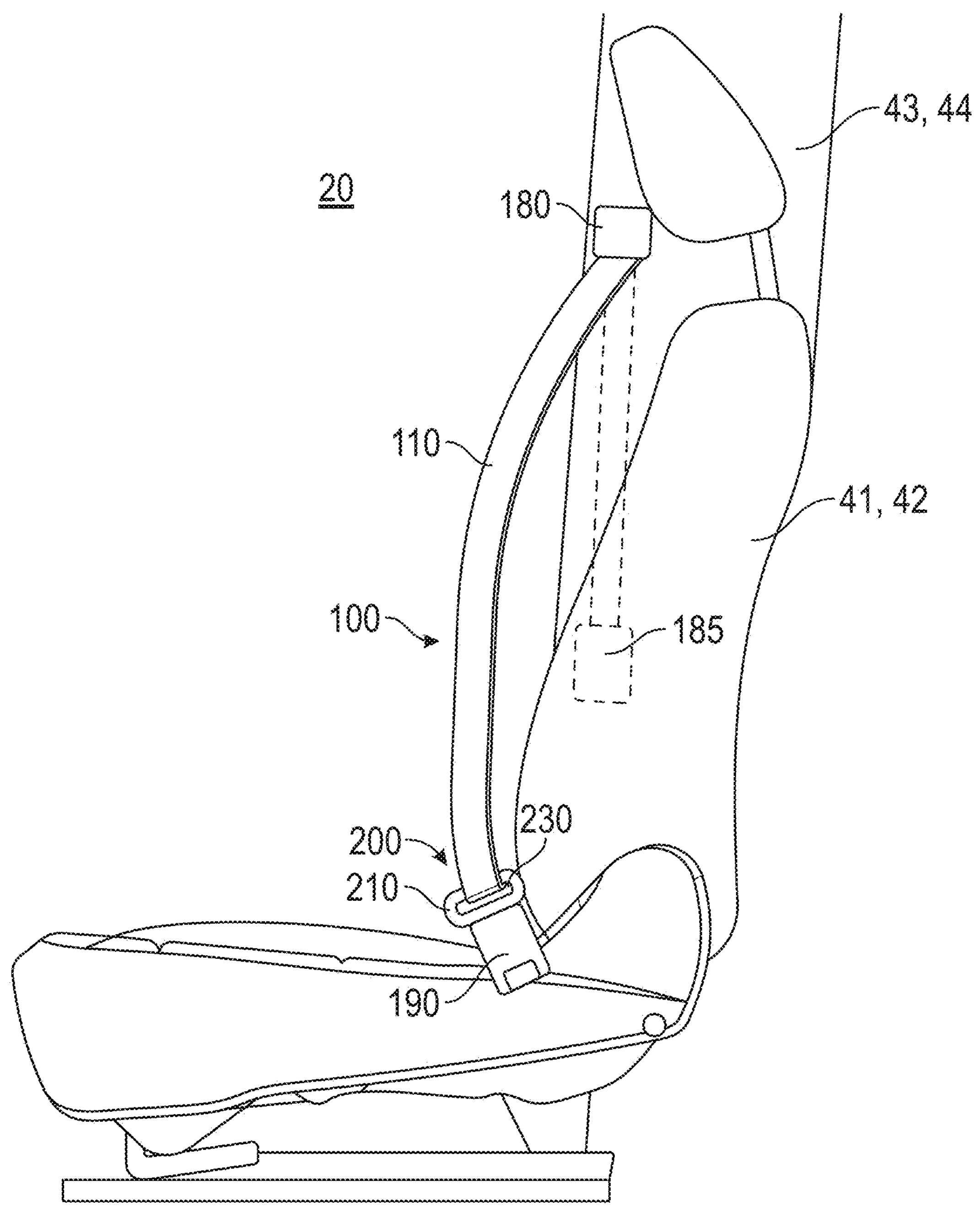
FIG. 2 is a side view of a vehicle seat and a seatbelt assembly according to a non-limiting example.

As shown in FIGS. 1 and 2, the passenger compartment 20 may include a front vehicle seat 41 and/or a rear vehicle seat 42. A seatbelt assembly 100 according to one or more embodiments may be positioned on the front vehicle seat 41 and/or the rear vehicle seat 42. The seatbelt assembly 100 includes a seatbelt 110 which is also commonly referred to as webbing or a strap. The seatbelt assembly 100 may include a pillar loop 180 disposed on an inner side of a B-pillar 43 and/or an inner side of a C-pillar 44, and a retractor 185 disposed within the B-pillar 43 and/or the C-pillar 44. One end of the seatbelt 110 may be coupled to the retractor 185. The retractor 185 may pretension the seatbelt 110 and allow the seatbelt 110 to be drawn and retracted in a controlled manner. The seatbelt 110 may extend from the retractor 185 to the pillar loop 180 and loop through the pillar loop 180. The pillar loop 180 and/or the retractor 185 may pull a segment of the seatbelt 110 over a shoulder of an occupant such that the seatbelt 110 is stretched across an upper body of the occupant. The seatbelt assembly 100 may further include a latching structure 200. The latching structure 200 may be a D-ring.

Figure 3B:
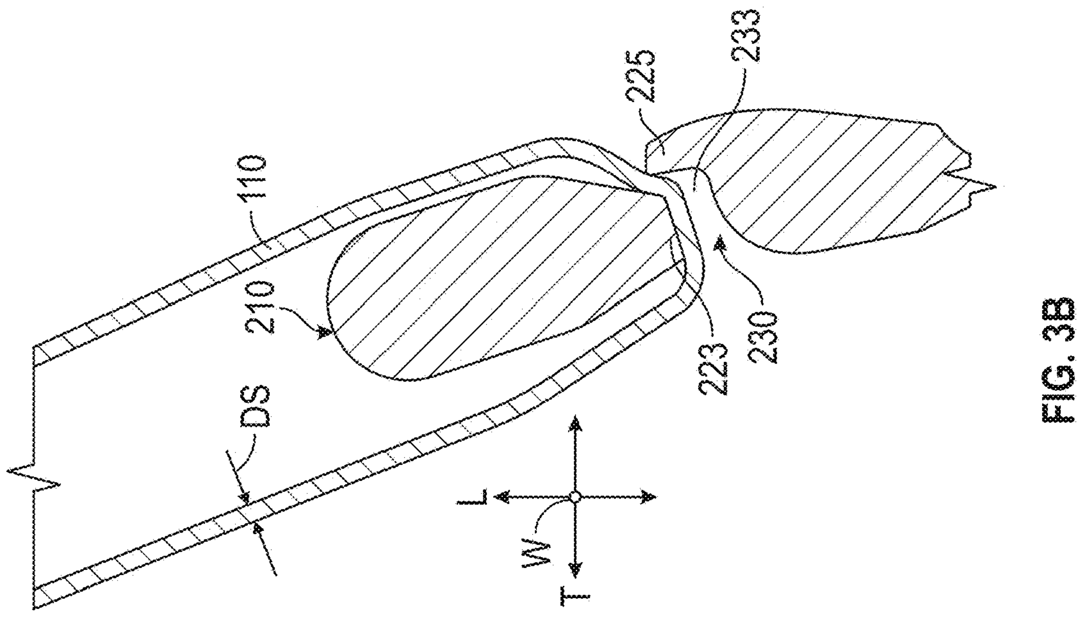
FIG. 3B shows a cross-sectional view of the latching structure taken at line 3B-3B in FIG. 3A.
Figure 3A:
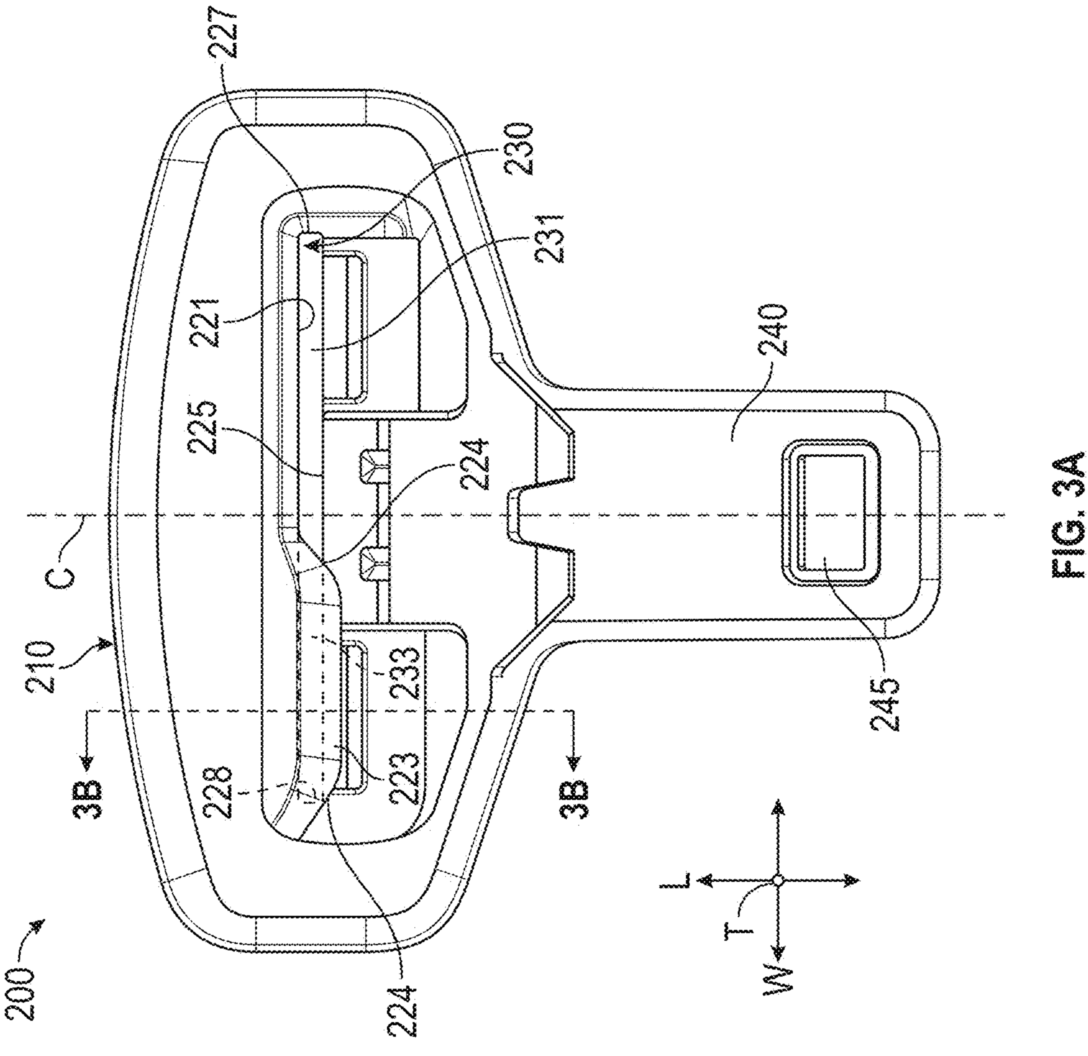
FIG. 3A shows a front view of a seatbelt latching structure according to a non-limiting example.

As shown in FIGS. 3A and 3B, the latching structure 200 defines a longitudinal direction L, a width direction W, and a thickness direction T. The latching structure 200 may further define a longitudinal centerline C extending in the longitudinal direction L at a center of the latching structure 200 in the width direction W. As shown in FIGS. 2, 3A, and 3B, a latching structure 200 according to one or more embodiments includes a main body 210 that defines a latch loop 230 along the width direction W. The seatbelt 110, which has a seatbelt thickness DS, passes through the latch loop 230 to extend to an anchor positioned on a side of the front vehicle seat 41 and/or the rear vehicle seat 42. If the seatbelt 110 has non-uniform thicknesses, the seatbelt thickness DS is defined as an average thickness of the seatbelt 110. The latching structure 200 may further include a latch tongue 240 on a lower side of the main body 210 along the longitudinal direction that is inserted into a buckle 190 positioned on a side of the front vehicle seat 41 and/or the rear vehicle seat 42 opposite the anchor. The latch tongue 240 includes a latch receiver opening 245 configured to receive a latch within the buckle 190 to secure the latching structure 200 to the buckle 190.

According to one or more embodiments, an upper end of the latch loop 230 is delimited by an upper edge 221 and a lip structure 223, and a lower end of the latch loop 230 is delimited by a lower edge 225. A first side edge 227 connects the upper edge 221 to the lower edge 225, and a second side edge 228 connects the lip structure 223 to the lower edge 225. The lip structure 223 extends downward beyond the upper edge 221. The lip structure 223 may have tapered ends 224 along the width direction W. The tapered ends 224 may prevent damage to the seatbelt 110 when the seatbelt 110 slides over the lip structure 223. The tapered ends 224 may have rounded edges to allow the seatbelt 110 to move smoothly thereover. The tapered ends 224 may prevent the seatbelt 110 getting snagged on the lip structure 223. According to a non-limiting example, an entirety of the lip structure 223 is on a first side of the longitudinal centerline C along the width direction, while no lip structure is disposed on a second side of the longitudinal centerline C along the width direction. According to non-limiting examples, the lip structure 223 may extend in the width direction W between 40% and 50% of the latch loop 230, between 42% and 48% of the latch loop 230, and between 45% and 47% of the latch loop 230.

Figure 4A:
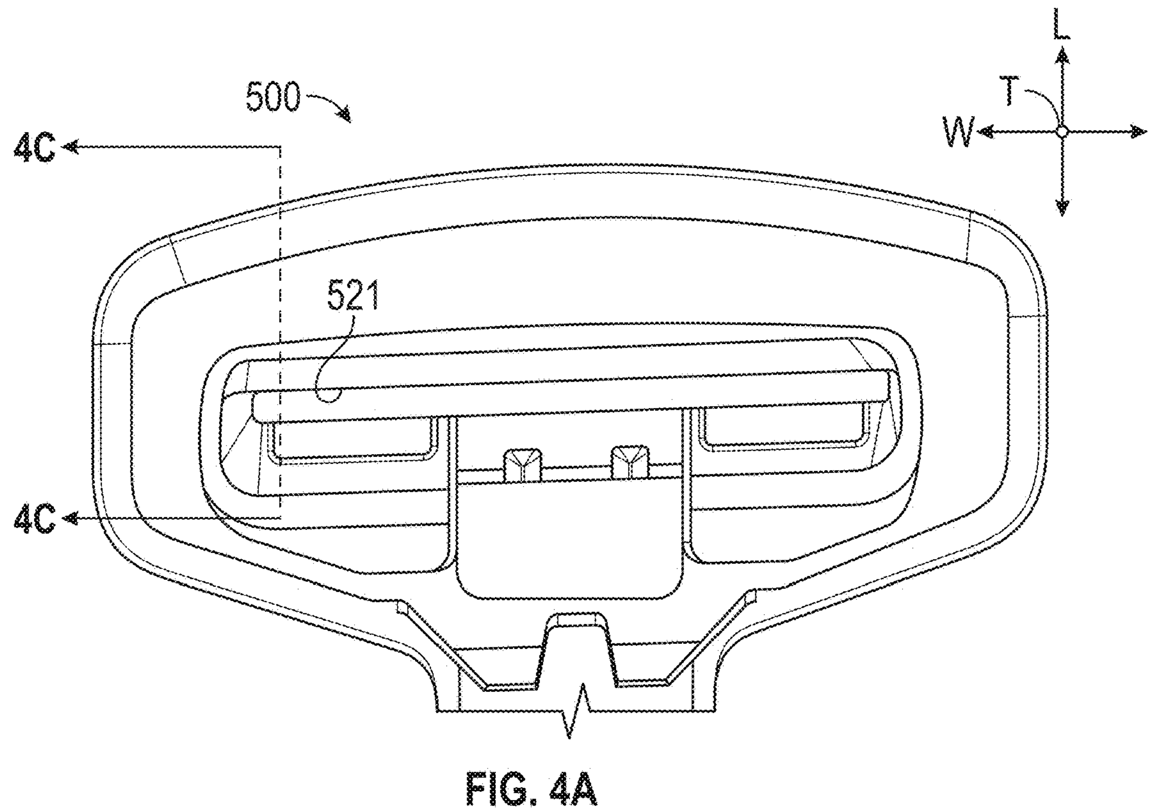
FIG. 4A is a front view of a baseline latching structure.
Figure 4B:
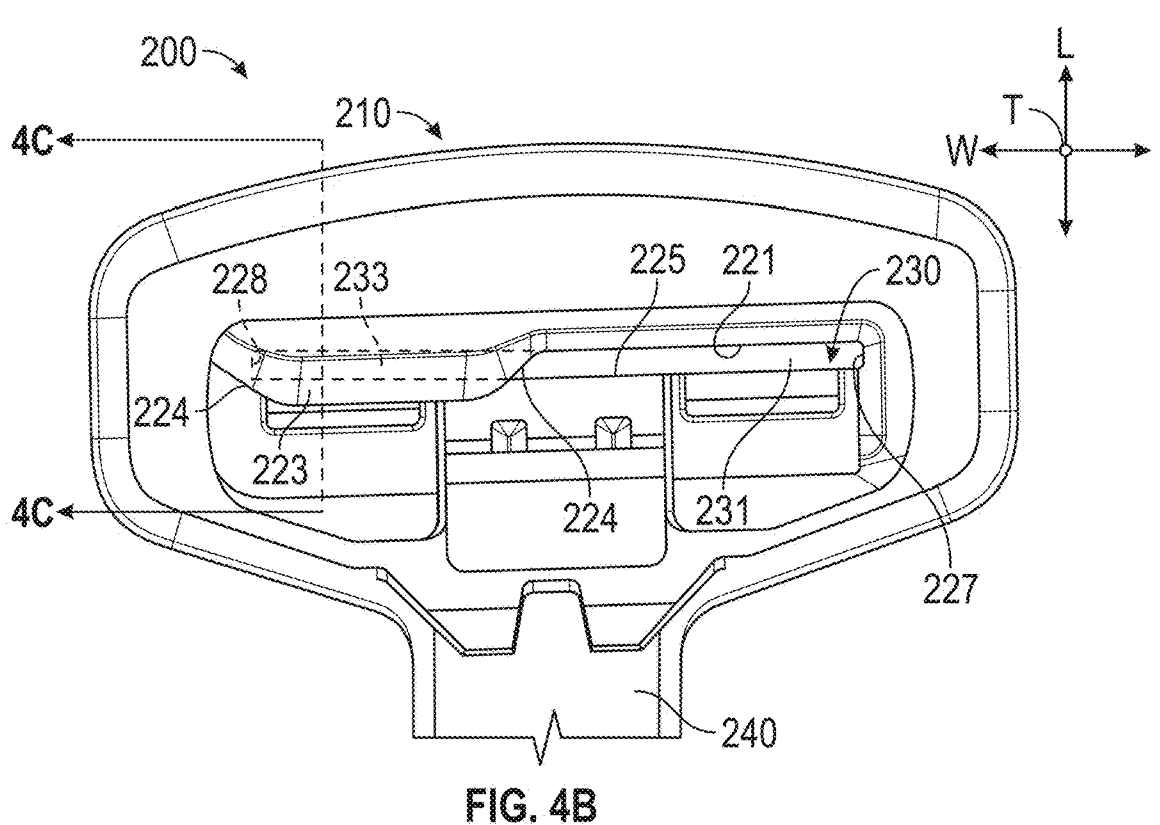
FIG. 4B is a front view of a latching structure according to a non-limiting example.
Figure 4C:
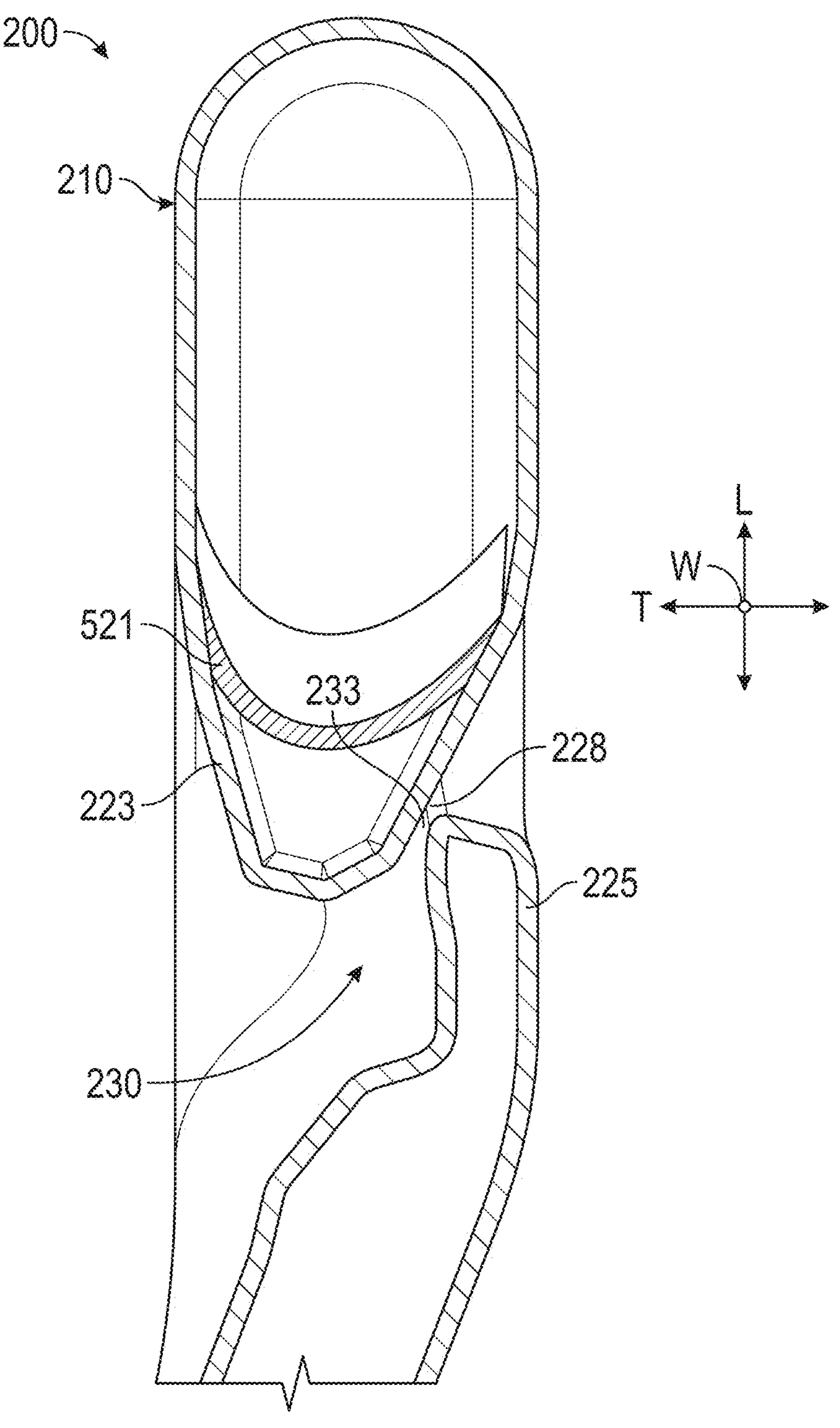
FIG. 4C is a cross-sectional view of a baseline upper edge of the baseline latching structure of FIG. 4A superimposed upon the latching structure of FIG. 4B taken at line 4C-4C according to a non-limiting example.

FIG. 4A shows a baseline latching structure 500 without a lip structure, while FIG. 4B shows a latching structure 200 according to one or more embodiments. As the baseline latching structure 500 lacks the lip structure, the baseline latching structure 500 has a baseline upper edge 521 that extends substantially straight along the width direction W. FIG. 4C shows the baseline upper edge 521 of the baseline latching structure 500 superimposed on the latching structure 200.

The latch loop 230 includes a first opening 231 defined between the upper edge 221 and the lower edge 225, and a second opening 233 defined between the lip structure 223 and the lower edge 225. The first opening 231 and the second opening 233 are continuous with each other.

Figures 6A, 6B, 6C:
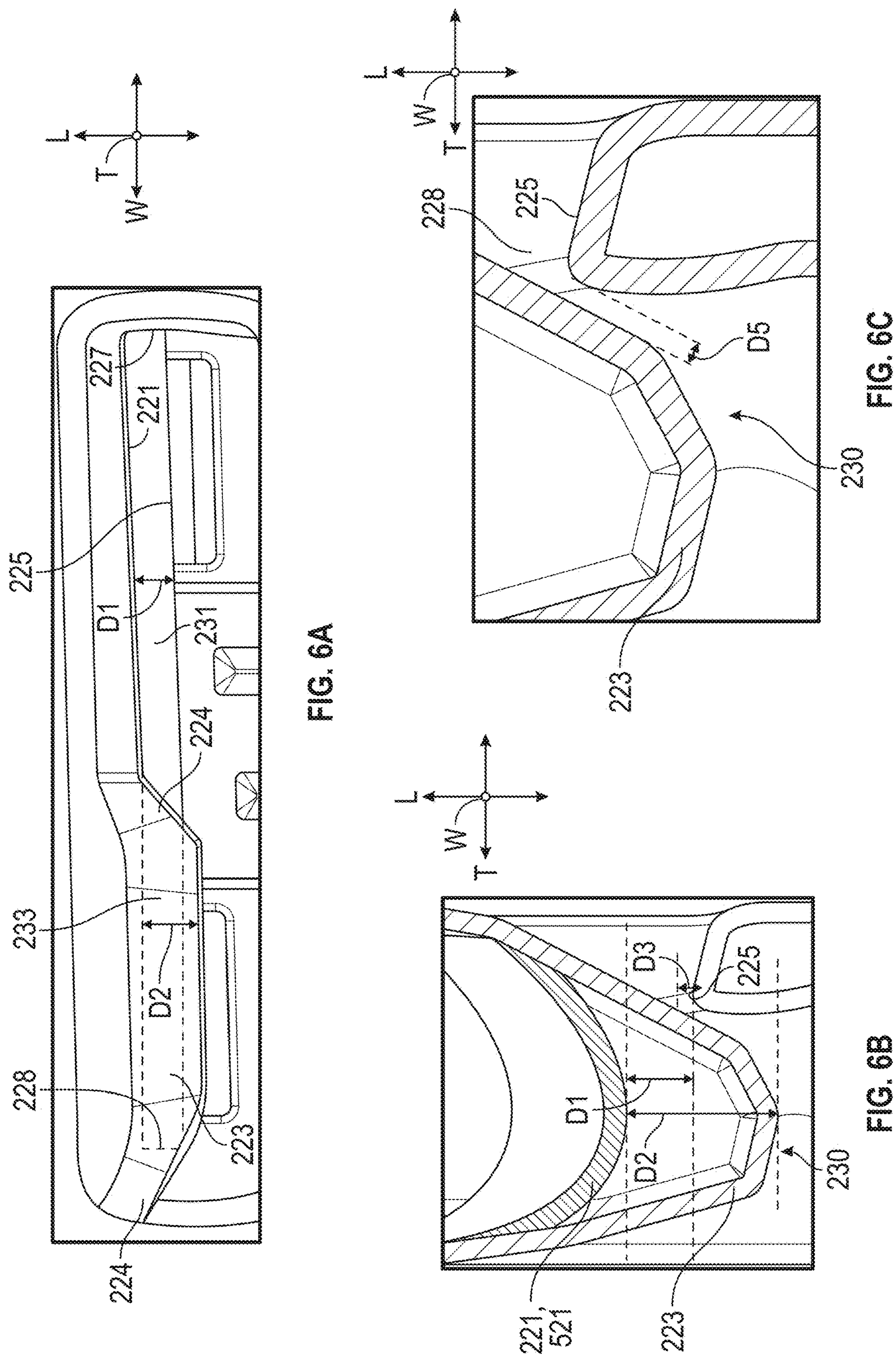
FIG. 6A is a close-up view of the latching structure of FIG. 4B.
FIGS. 6B and 6C are a close-up views of the latching structure of FIG. 4C.

As shown in FIGS. 4A and 4B, outside of the lip structure 223, the upper edge 221 and the baseline upper edge 521 have corresponding shapes. As such, in FIG. 6B, a longitudinal position of the baseline upper edge 521 may be considered to correspond to a longitudinal position of the upper edge 221 of the latching structure 200. As shown in FIGS. 6A and 6B, a longitudinal distance D1 is defined between a lowermost end of the upper edge 221 and an uppermost end of the lower edge 225, and a longitudinal distance D2 is defined between a lowermost end of the lip structure 223 and the uppermost end of the lower edge 225. According to one or more embodiments, the longitudinal distance D2 is greater than the longitudinal distance D1 such that the lip structure 223 extends downward beyond the lower edge 225 and the lip structure 223 overlaps the lower edge 225 along the thickness direction T. The longitudinal distance D1 may be between 2 mm and 4 mm. The longitudinal distance D1 may be between 2.5 mm and 3.5 mm. The longitudinal distance D1 may be between 2.5 mm and 3.5 mm. The longitudinal distance D1 may be between 2.9 mm and 3.1 mm.

As shown in FIG. 6B, a smallest distance in the longitudinal direction between the lip structure 223 and the lower edge 225 is defined as a minimum longitudinal distance D3. According to one or more embodiments, the minimum longitudinal distance D3 is less than the longitudinal distance D1.

As shown in FIG. 6C, a smallest distance between the lip structure 223 and the lower edge 225 is defined as an absolute minimum distance D5. The absolute minimum distance D5 may be set to be equal to or greater than the thickness DS of the seatbelt 110. The absolute minimum distance D5 may be less than 2 times the thickness DS of the seatbelt 110. The absolute minimum distance D5 may be less than 1.5 times the thickness DS of the seatbelt 110. The absolute minimum distance D5 may be less than 1.2 times the thickness DS of the seatbelt 110.

Figures 5A, 5B, 5C, 5D:
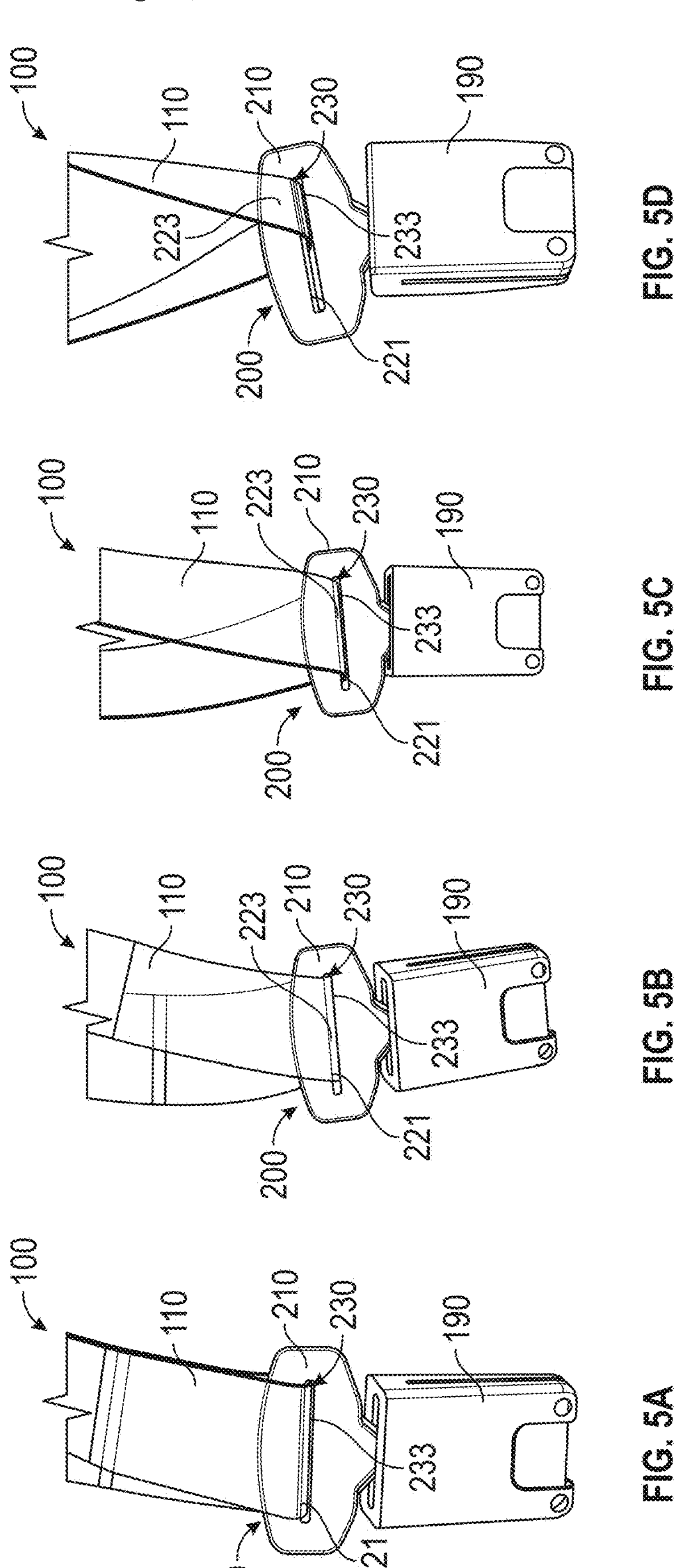
FIGS. 5A, 5B, 5C, and 5D show different stages of a seatbelt assembly according to a non-limiting example during a collision.

FIGS. 5A-5D show a portion of the seatbelt assembly 100 according to one or more embodiments during different stages of a collision. FIG. 5A shows the seatbelt assembly 100 prior to the collision. Prior to the collision, the seatbelt 110 is centered within the latch loop 230. FIG. 5B shows the seatbelt assembly 100 at 28 milliseconds after the collision, at which point the seatbelt 110 moves towards an end of the latch loop 230. FIG. 5C shows the seatbelt assembly 100 at 46 milliseconds after the collision, at which point the seatbelt 110 abuts the end of the latch loop 230 and begins to exert compression forces on the seatbelt 110 along the width direction W. For a conventional seatbelt, these compression forces on the seatbelt may result in bunching of the seatbelt. In contrast, as shown in FIG. 5D, which shows the seatbelt assembly 100 at 80 milliseconds after the collision, the lip structure 223 and the second opening 233 defined thereby restricts the seatbelt 110 from bunching. Accordingly, a seatbelt assembly 100 according to one or more embodiments may prevent seatbelt bunching.

According to one or more embodiments, the absolute minimum distance D5 between the lip structure 223 and the lower edge 225 is set to be relatively close to the thickness DS of the seatbelt 110 (e.g., between 1 to 2 times the thickness DS). Thus, when the seatbelt 110 is biased towards the second opening 233 during a collision, the seatbelt 110 is preventing from bunching by operation of the lip structure 223 and the lower edge 225 due to limited size of the second opening 233.

Figures 7A, 7B:
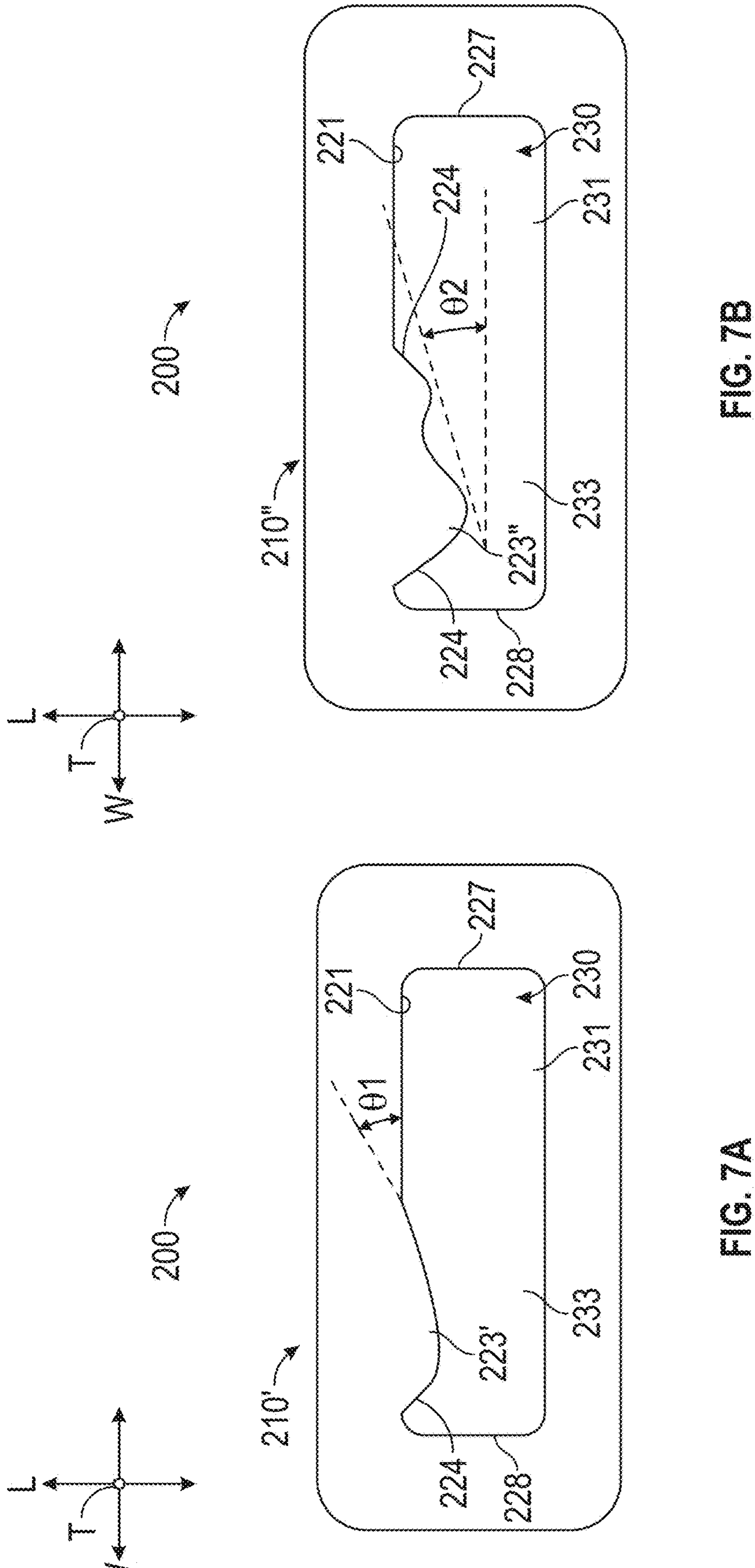
FIGS. 7A and 7B show latching structures according to non-limiting examples.

The latching structure 200 is not limited to the lip structure 223 shown in FIGS. 3A-6C. As a non-limiting example, as shown in FIG. 7A, the latching structure 200 may include a main body 210' that comprises a lip structure 223' that is shaped as an elliptical lobe that forms an acute angle θ1 with the upper edge 221. As a non-limiting example, as shown in FIG. 7B, the latching structure 200 may include a main body 210" that comprises a lip structure 223" that includes a multi-step progressive structure, with a line connecting lowermost portions of steps forming the multi-step progressive structure forming an acute angle θ2 with the width direction W.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A latching structure for a vehicle seatbelt, the latching structure defining a longitudinal direction, a width direction, and a thickness direction, and comprising:

a main body comprising a latch loop defined at least in part by an upper edge, a lip structure, and a lower edge, wherein the latch loop comprises a first opening defined between the upper edge and the lower edge, and a second opening defined between the lip structure and the lower edge, and wherein the lip structure and the lower edge overlap along the thickness direction.

2. The latching structure of claim 1, wherein the upper edge and the lower edge do not overlap along the thickness direction.

3. The latching structure of claim 1, wherein a smallest distance in the longitudinal direction between the lip structure and the lower edge is defined as a minimum longitudinal distance, and the minimum longitudinal distance is less than a longitudinal distance between a lowermost end of the upper edge and an uppermost end of the lower edge.

4. The latching structure of claim 1, wherein a first side edge extends between the upper edge and the lower edge, and a second side edge extends between the lip structure and the lower edge.

5. The latching structure of claim 4, wherein the first and second side edges are opposite each other along the width direction.

6. The latching structure of claim 1, wherein the lip structure comprises tapered ends along the width direction.

7. The latching structure of claim 1, wherein an entirety of the lip structure is on one side of a longitudinal centerline of the latching structure.

8. The latching structure of claim 1, wherein a latch tongue extends from a lower side of the main body along the longitudinal direction.

9. A seatbelt assembly comprising:

a latching structure defining a longitudinal direction, a width direction, and a thickness direction, and comprising a main body comprising a latch loop defined at least in part by an upper edge, a lip structure, and a lower edge; and a seatbelt passing through the latch loop, wherein the latch loop comprises a first opening defined between the upper edge and the lower edge, and a second opening defined between the lip structure and the lower edge, and wherein the lip structure and the lower edge overlap along the thickness direction.

10. The seatbelt assembly of claim 9, wherein the upper edge and the lower edge do not overlap along the thickness direction.

11. The seatbelt assembly of claim 9, wherein a smallest distance in the longitudinal direction between the lip structure and the lower edge is defined as a minimum longitudinal distance, and the minimum longitudinal distance is less than a longitudinal distance between a lowermost end of the upper edge and an uppermost end of the lower edge.

12. The seatbelt assembly of claim 9, wherein a first side edge extends between the upper edge and the lower edge, and a second side edge extends between the lip structure and the lower edge.

13. The seatbelt assembly of claim 12, wherein the first and second side edges are opposite each other along the width direction.

14. The seatbelt assembly of claim 9, wherein the lip structure comprises tapered ends along the width direction.

15. The seatbelt assembly of claim 9, wherein an entirety of the lip structure is on one side of a longitudinal centerline of the latching structure.

16. The seatbelt assembly of claim 9, wherein a latch tongue extends from a lower side of the main body along the longitudinal direction.

17. The seatbelt assembly of claim 9, wherein a smallest distance between the lip structure and the lower edge is defined as an absolute minimum distance, and the absolute minimum distance is between 1 to 2 times a seatbelt thickness of the seatbelt.

18. A vehicle comprising:

a vehicle seat; and a seatbelt assembly mounted on or adjacent to the vehicle seat, wherein the seatbelt assembly comprises:

a latching structure defining a longitudinal direction, a width direction, and a thickness direction, and comprising a main body comprising a latch loop defined at least in part by an upper edge, a lip structure, and a lower edge; and a seatbelt passing through the latch loop, wherein the latch loop comprises a first opening defined between the upper edge and the lower edge, and a second opening defined between the lip structure and the lower edge, wherein the lip structure and the lower edge overlap along the thickness direction, wherein the upper edge and the lower edge do not overlap along the thickness direction, wherein a smallest distance in the longitudinal direction between the lip structure and the lower edge is defined as a minimum longitudinal distance, and the minimum longitudinal distance is less than a longitudinal distance between a lowermost end of the upper edge and an uppermost end of the lower edge, wherein a first side edge extends between the upper edge and the lower edge, and a second side edge extends between the lip structure and the lower edge, wherein the first and second side edges are opposite each other along the width direction, wherein the lip structure comprises tapered ends along the width direction, wherein an entirety of the lip structure is on one side of a longitudinal centerline of the latching structure, wherein a latch tongue extends from a lower side of the main body along the longitudinal direction, and wherein a smallest distance between the lip structure and the lower edge is defined as an absolute minimum distance, and the absolute minimum distance is between 1 to 2 times a seatbelt thickness of the seatbelt.

* * * * *